(12) United States Patent
Liu

(10) Patent No.: US 9,228,616 B2
(45) Date of Patent: Jan. 5, 2016

(54) UNIVERSAL JOINT

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Zhen-Xing Liu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/183,544

(22) Filed: Feb. 19, 2014

(65) Prior Publication Data

US 2014/0248966 A1    Sep. 4, 2014

(30) Foreign Application Priority Data

Mar. 1, 2013    (CN) .......................... 2013 1 0646828

(51) Int. Cl.
  *F16D 3/43*    (2006.01)
  *F16D 3/42*    (2006.01)
(52) U.S. Cl.
  CPC ....................................... *F16D 3/42* (2013.01)
(58) Field of Classification Search
  CPC ........................................................ F16D 3/42
  USPC .................................................. 464/125, 126
  See application file for complete search history.

(56) References Cited

U.S. PATENT DOCUMENTS

| 109,846 | A | * | 12/1870 | Smeed ........................... 464/125 |
| 1,556,467 | A | * | 10/1925 | Abell ............................. 464/125 |
| 1,894,986 | A | * | 1/1933 | Frins .............................. 464/126 |
| 5,433,667 | A | * | 7/1995 | Schafer et al. ............ 464/125 X |

OTHER PUBLICATIONS

Universal Joint and Driveshaft Design Manual, AE-7, Society of Automotive Engineers, Inc., Warrendale, PA, pp. 209-211, TJ1079. S62 1979.*

* cited by examiner

*Primary Examiner* — Gregory Binda
(74) *Attorney, Agent, or Firm* — Novak Druce Connolly Bove + Quigg LLP

(57) ABSTRACT

A universal joint includes a first rotating member, an annular connecting member, a pair of first connecting assemblies, a second rotating member, and a pair of second connecting assemblies. The annular connecting member is rotatably sleeved on the first rotating member, the connecting member defines a pair of first connecting holes at opposite sides and a pair of second connecting holes at opposite sides. The pair of first connecting assemblies respectively extends into the pair of first connecting holes to rotatably connect the first rotating member to the connecting member. The second rotating member is rotatably sleeved on the connecting member. The pair of second connecting assemblies respectively extends into the pair of second connecting holes to rotatably connect the second rotating member to the connecting member.

3 Claims, 5 Drawing Sheets

UNIVERSAL JOINT

BACKGROUND

1. Technical Field

The present disclosure relates to a connecting structure, and particularly to an universal joint.

2. Description of Related Art

An universal joint may include a first rotating assembly, a second rotating assembly, and a connection assembly interconnecting the first rotating assembly and the second rotating assembly. The first rotating assembly includes a rotating member in "Y" shape and a pivoting member. The rotating member includes a main body and a pair of rotating portions perpendicularly extending from opposite ends of the main body toward a same direction. Opposite ends of the pivoting member are respectively connected to the pair of rotating portions. The second rotating assembly has a structure the same as that as the first rotating assembly. The connecting assembly includes a rod-like connecting member and an engaging member. The pivotal member of the first rotating assembly is arranged perpendicular to the pivotal member of the second rotating assembly. The connecting member extends through the two pivoting members and engages with the engaging member, thereby combining the two pivoting members for composing the universal joint. However, the two rotating members extend from opposites sides of the two pivoting members, occupying a large space.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
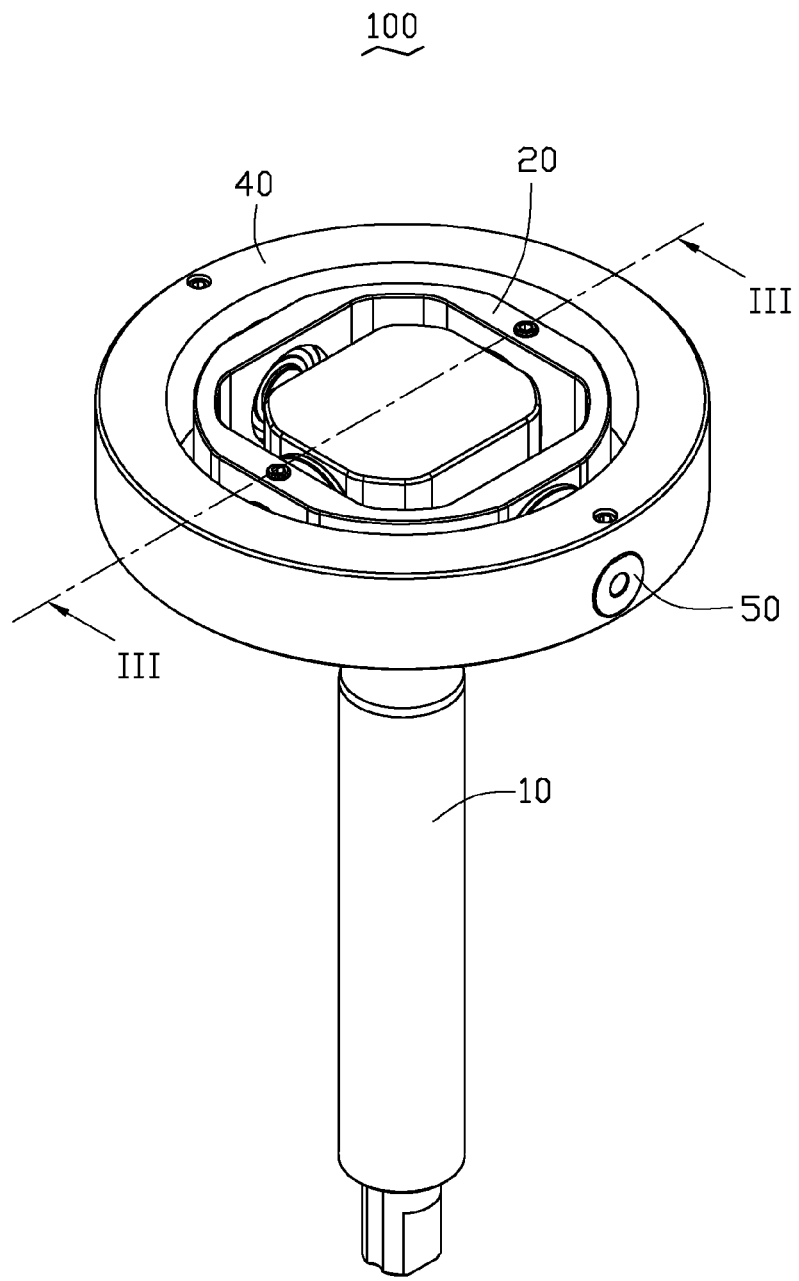
FIG. 1 is an isometric view of an embodiment of a universal joint.
Figure 2:
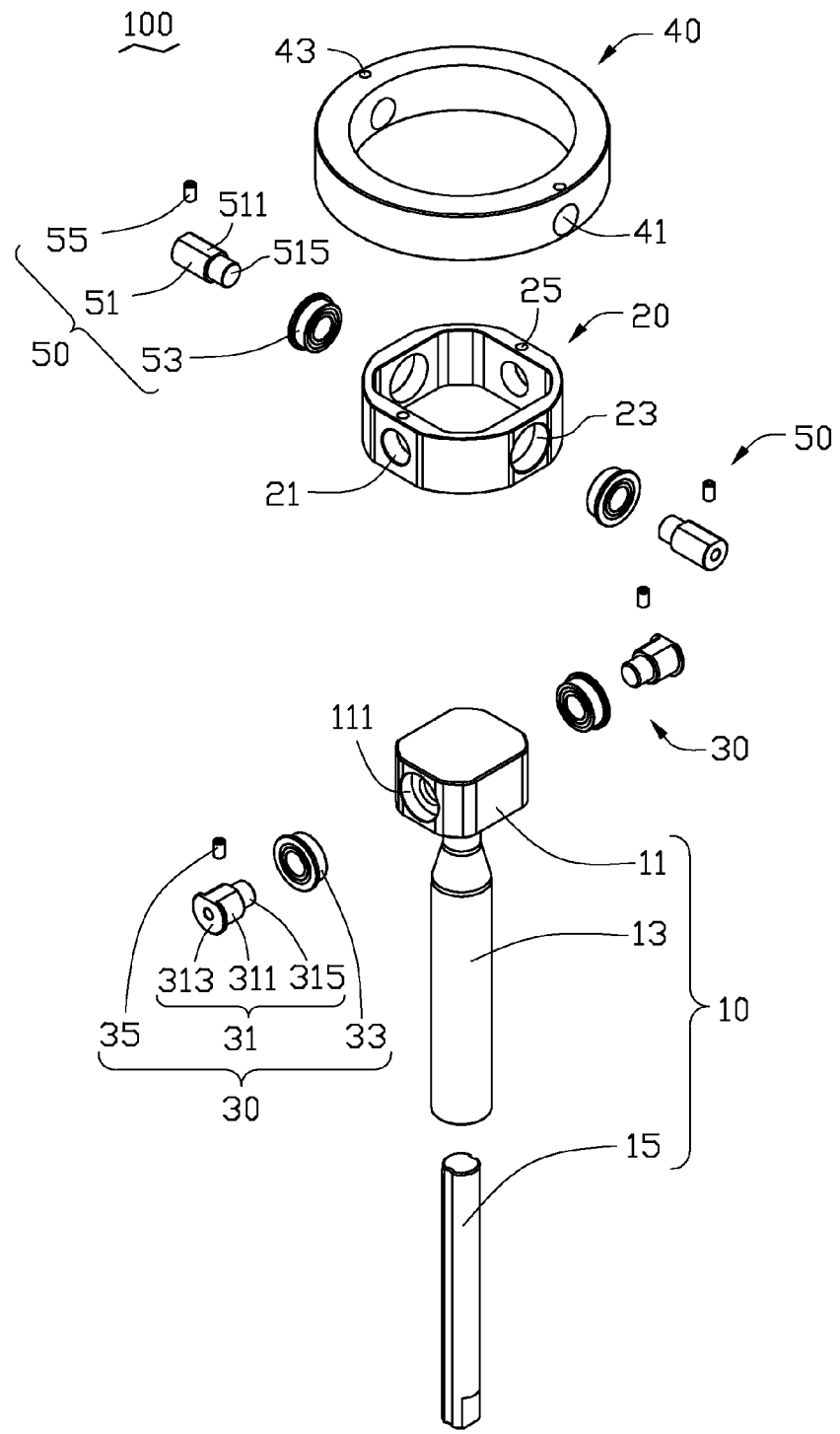
FIG. 2 is an exploded, isometric view of the universal joint of FIG. 1.
Figure 3:
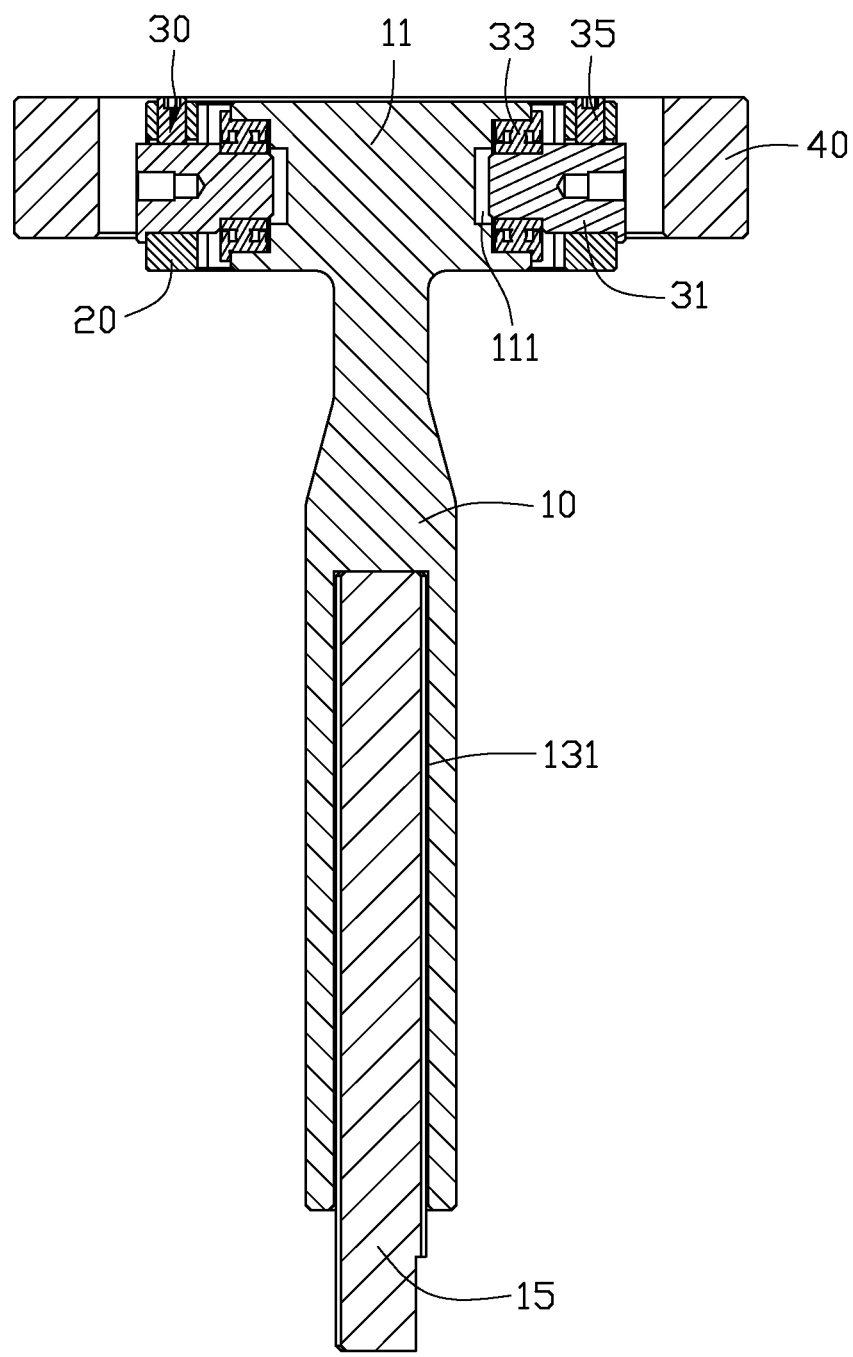
FIG. 3 is a cross-sectional view of the universal joint of FIG. 1, taken along line III-III.

FIGS. 1 through 3 show an embodiment of a universal joint 100. The universal joint 100 includes a first rotating member 10, a connecting member 20, a pair of first connecting assemblies 30, a second rotating member 40, and a pair of second connecting assemblies 50. The first rotating member 10 extends into the connecting member 20, and rotatably connects with the connecting member 20 via the pair of first connecting assemblies 30. The second rotating member 40 is sleeved on the connecting member 20, and rotatably connects with the connecting member 20 via the pair of second connecting assemblies 50. The first rotating member 10 is capable of rotating relative to the connecting member 20 along a first axis, and the second rotating member 40 is capable of rotating relative to the connecting member 20 along a second axis perpendicular to the first axis.

The first rotating member 10 is in a rod shape, and includes a head portion 11 and a rod portion 13 coaxially connected to an end of the head portion 11. A spline shaft 15 is partially received in the rod portion 13. The head portion 11 is substantially cubic in shape, and defines a pair of first rotation holes 111 on opposite sides thereof. The rod portion 13 axially defines a spline hole 131. The spline shaft 15 is slidably received in the spline hole 131 of the rod portion 13, and is partially exposed out of the spline hole 131.

The connecting member 20 is substantially annular, and rotatably sleeved on the head portion 11 of the first rotating member 10. The connecting member 20 defines a pair of first connecting holes 21 along the first axis, and a pair of second connecting holes 23 along the second axis. The pair of first connecting holes 21 is arranged on opposite sides of the connecting member 20, and the pair of second connecting holes 23 is arranged on opposite sides of the connecting member 20. A connection line of the pair of first connecting holes 21 is perpendicular to a connection line of the pair of second connecting holes 23. The connecting member 20 further defines a pair of locking holes 25 on an end surface thereof. The pair of locking holes 25 respectively communicates with the pair of first connecting holes 21.

The pair of first connecting assemblies 30 is respectively assembled in the pair of first rotation holes 111 of the first rotating members 10. Each first connecting assembly 30 includes a first supporting member 31, a first bearing 33, and a first locking member 35. The first supporting member 31 is substantially cylindrically and extends into the corresponding first connecting hole 21 of the connecting member 20, and the corresponding first rotation hole 111. The first supporting member 31 includes a main body 311, an anti-slip portion 313, and an inserting portion 315. The anti-slip portion 313 and the inserting portion 315 protrude from opposite ends of the main body 311. The main body 311 is received in the first connecting hole 21, and the inserting portion 315 is received in the first rotation hole 111 of first rotating member 10. The anti-slip portion 313 has a diameter greater than that of the main body 311 and blocks at a side of the connecting member 20 for avoiding the connecting member 20 detached from the main body 311. The first bearing 33 is sleeved on the inserting portion 315, and received in the first rotation hole 111 of the first rotating member 11. The first locking member 35 is inserted into corresponding one locking hole 25, and resists the main body 311 of the first supporting member 31.

The second rotating member 40 is substantially annular, and rotatably sleeved on the connecting member 20. The second rotating member 40 defines a pair of second rotation holes 41 and a pair of resisting holes 43. The pair of second rotation holes 41 are arranged on opposite sides of the second rotating member 40, and the pair of resisting holes 43 are defined on an end surface of the second rotating member 40 and respectively communicates with the pair of second rotation holes 41.

The pair of second connecting assemblies 50 is respectively assembled to the pair of second connecting holes 23. Each second connecting assembly 50 has a structure similar to a structure of the first connecting assembly 30, and includes a second supporting member 51, a second bearing 53, and a second locking member 55. The second supporting member 51 includes a main body 511 and an inserting portion 515 protruding from an end of the main body 511. The second supporting member 51 does not include an anti-slip portion. The main body 511 is received in the second rotation hole 41, while the inserting portion 515 is received in corresponding one second connecting hole 23 of the connecting member 20. The second bearing 53 is sleeved on the inserting portion 515, and received in the second connecting hole 23 of the connecting member 20. The second locking member 55 is inserted into the corresponding resisting hole 43, and resisting the main body 511 of the second supporting member 51.

When in assembly, the connecting member 20 is rotatably sleeved on the head portion 11 of the first rotating member 10. The first supporting member 31 is inserted into the first connecting hole 21 of the connecting member 20 and the first rotation hole 111 of the first rotating member 10. The first bearing 33 is sleeved over the inserting portion 315, and is received in the first rotation hole 111 of the first rotating member 10. The first locking member 35 is inserted into the locking hole 25 of the connecting member 20, and resists against the main body 311 of the first supporting member 31. The second rotating member 40 is rotatably sleeved on the connecting member 20. The second supporting member 51 is inserted into the second rotation hole 41 of the second rotating member 40 and the second connecting hole 23 of the connecting member 20. The second bearing 53 is sleeved over the inserting portion 515, and is received in the second connecting hole 23 of the connecting member 20. The second locking member 55 is inserted into corresponding one resisting hole 43 and resisting against the main body 511 of the second supporting member 51.

Figure 4:
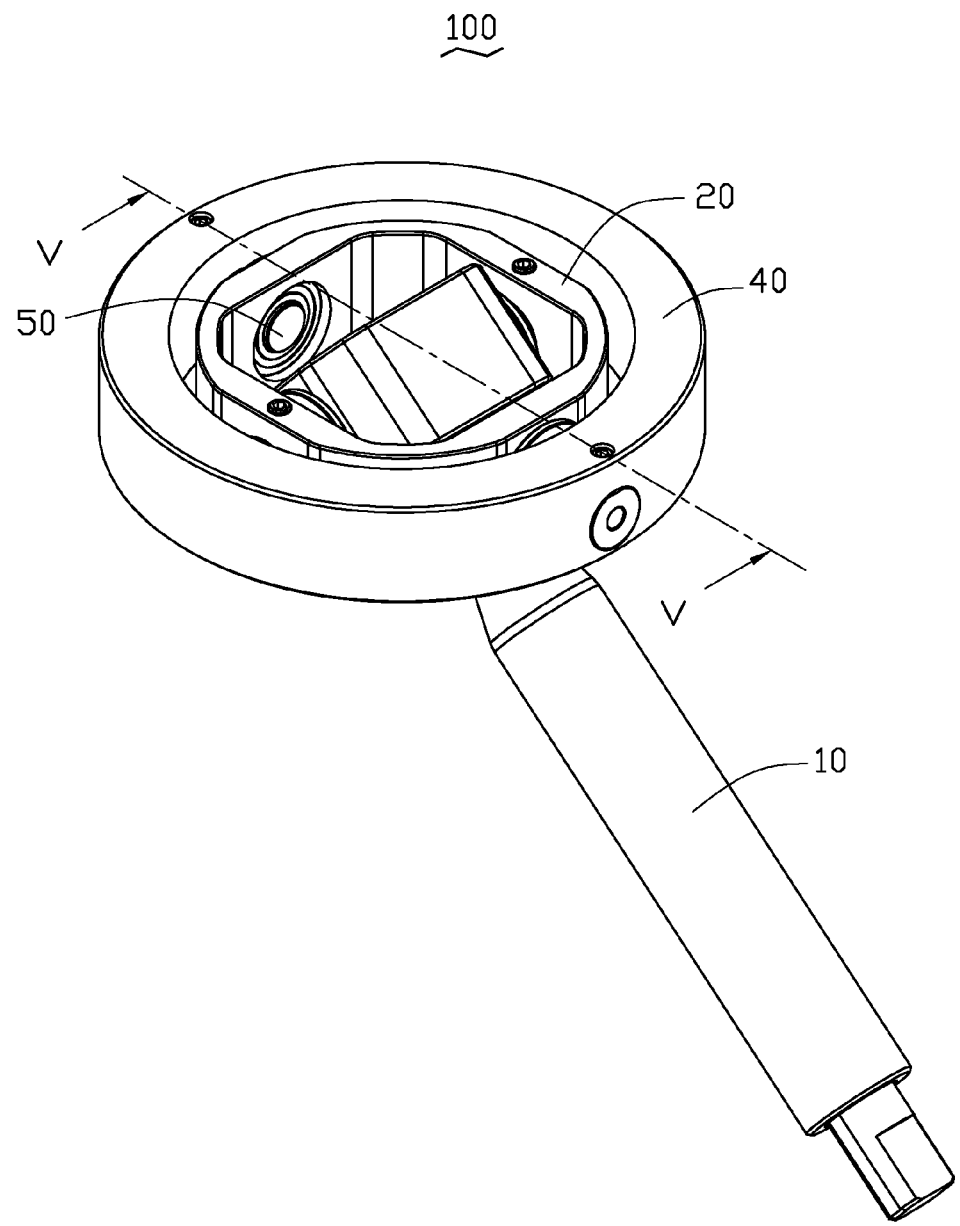
FIG. 4 is an isometric view of the universal joint of FIG. 1 in another use state.
Figure 5:
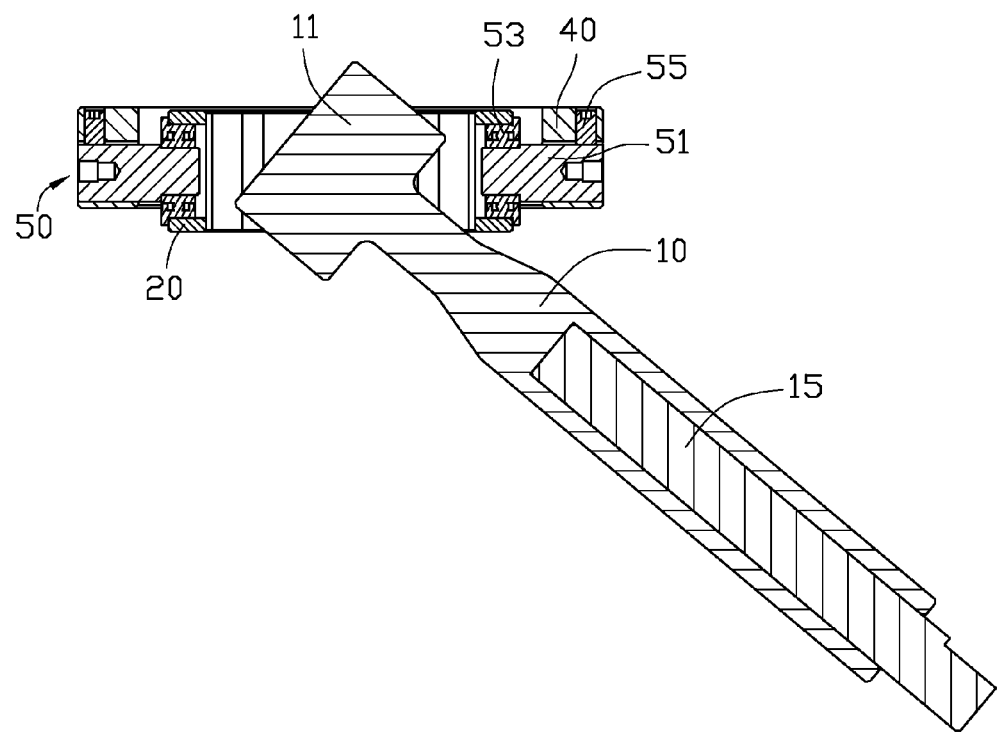
FIG. 5 is a cross-sectional view of the universal joint of FIG. 4, taken along line V-V.

FIGS. 4 and 5 shows that when the universal joint 100 is in use, the spline shaft 15 is connected to a first working portion (not shown), the second rotating member 40 is connected to a second working portion (not shown). The first working portion rotates relative to the second working portion, the spline shaft 15 slides relative to the first rotating member 10 and drives the first rotating member 10 to rotate relative to the connecting member 20 along the first axis. The connecting member 20 rotates relative to the second rotating member 40 along the second axis, thus providing a dual-axis rotation between the spline shaft 15 and the second rotating member 50.

Because the first rotating member 10 is inserted into the connecting member 20, and the connecting member 20 is received in the second rotating member 40, the length and volume of the universal joint 100 is thereby reduced.

Each first connecting assembly 30 may be one connecting portion extending from a side of the connecting member 20 and rotatably connected to the head portion 11 of the first rotating member 10. Similarly, each second connecting assembly 50 may be one connecting portion extending from a side of the connecting member 20.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A universal joint, comprising:
a first rotating member defining a pair of first rotation holes on opposite sides thereof;
a connecting member is substantially annular and rotatably sleeved on the first rotating member, the connecting member defining a pair of first connecting holes at opposite sides thereof and a pair of second connecting holes at opposite sides thereof, respectively, a connecting line of the pair of first connecting holes being perpendicular to a connection line of the pair of second connecting holes;
a pair of first connecting assemblies respectively extending into the pair of first connecting holes to rotatably connect the first rotating member to the connecting member, each of the pair of first connecting assemblies partially received in the corresponding first rotating hole;
a second rotating member rotatably sleeved on the connecting member; and
a pair of second connecting assemblies respectively extending into the pair of second connecting holes to rotatably connect the second rotating member to the connecting member; wherein the first rotating member is capable of rotating relative to the connecting member along a first axis, and the second rotating member is capable of rotating relative to the connecting member along a second axis perpendicular to the first axis;
wherein the first rotating member comprises a head portion, a rod portion coaxially connected to an end of the head portion, and a spline shaft partially received in the rod portion, the head portion defines the pair of first rotation holes on opposite sides thereof, the rod portion axially defines a spline hole therein, the spline shaft is slidably received in the spline hole of the rod portion, and partially exposes out of the spline hole;
wherein the connecting member is rotatably sleeved on the head portion of the first rotating member, the pair of first connecting assemblies is arranged symmetrically, the pair of second connecting assemblies is arranged symmetrically;
wherein the connecting member defines a pair of locking holes on an end surface thereof, the pair of locking holes respectively communicates with the pair of first connecting holes, each first connecting assembly comprises a first supporting member and a first locking member, the first supporting member inserts into one first rotation hole and one first connecting hole, the first locking member inserts into one locking hole and resists the first supporting member;
wherein the first supporting member comprises a main body, an anti-slip portion, and an inserting portion, the anti-slip portion and the inserting portion protrude from opposite ends of the main body, the main body is received in the first connecting hole, the inserting portion is received in the first rotation hole of the first rotating member;
wherein the anti-slip portion has a diameter greater than that of the main body and blocks at a side of the connecting member, each first connecting assembly further comprises a first bearing sleeved on the inserting portion and received in the first rotation hole of the first rotating member, the first locking member inserts into one locking hole and resists the main body.

2. The universal joint of claim 1, wherein the second rotating member defines a pair of second rotation holes arranged on opposite sides thereof and a pair of resisting holes defined on an end surface thereof, the pair of resisting holes respectively communicates with the pair of second rotation holes, each second connecting assembly comprises a second supporting member and a second locking member, the second supporting member inserts into one second rotation hole and one second connecting hole, the second locking member inserts into one resisting hole and resists the second supporting member.

3. The universal joint of claim 2, wherein the second supporting member comprises a main body and an inserting portion protruding from an end of the main body, the main body is received in the second rotation hole, the inserting portion is received in one second connecting hole of the connecting member, each second connecting assembly further comprises a second bearing sleeved on the inserting portion and received in the second connecting hole of the connecting member, the second locking member inserts into one resisting hole and resists the main body of the second supporting member.

\* \* \* \* \*